US007689008B2

(12) United States Patent
Hammoud et al.

(10) Patent No.: US 7,689,008 B2
(45) Date of Patent: Mar. 30, 2010

(54) SYSTEM AND METHOD FOR DETECTING AN EYE

(75) Inventors: Riad I. Hammoud, Kokomo, IN (US); Andrew L. Wilhelm, Kokomo, IN (US)

(73) Assignee: Delphi Technologies, Inc., Troy, MI (US)

(*) Notice: Subject to any disclaimer, the term of this patent is extended or adjusted under 35 U.S.C. 154(b) by 895 days.

(21) Appl. No.: 11/150,684

(22) Filed: Jun. 10, 2005

(65) Prior Publication Data
US 2007/0014431 A1    Jan. 18, 2007

(51) Int. Cl.
*G06K 9/00* (2006.01)
(52) U.S. Cl. .................. 382/117; 382/103; 382/115; 382/118
(58) Field of Classification Search ............. 382/103, 382/115, 117, 118
See application file for complete search history.

(56) References Cited

U.S. PATENT DOCUMENTS

| 5,298,732 | A  | * | 3/1994 | Chen ................. 351/44 |
| 6,895,103 | B2 | * | 5/2005 | Chen et al. ............ 382/117 |
| 2004/0017933 | A1 | * | 1/2004 | Lestideau ............ 382/118 |
| 2004/0151350 | A1 | * | 8/2004 | Tafuku et al. ........... 382/116 |
| 2006/0098867 | A1 | * | 5/2006 | Gallagher ............. 382/190 |

FOREIGN PATENT DOCUMENTS

WO        97/21188        6/1997

OTHER PUBLICATIONS

EP Search Report Dated Oct. 18, 2006.
D'Orazio T et al: "A neural system for eye detection in a driver vigilance application" Intelligent Transportation Systems, 2004. Proceedings. The 7th International IEEE Conference on Washington, DC, USA Oct. 3-6, 2004, Piscataway, NJ, USA IEEE Oct. 3, 2004, pp. 320-325, WP010772397 ISBN: 0-7803-8500-4 abstract p. 320, section 1; p. 321, section 2.
Sil J et al: "A hybrid approach to designing an autonomous driving alert system using geometrical features and gray level imformation of face images" IEEE Region 5, 2003 Annual Technical Conference New Orleans, LA, USA Apr. 11, 2003, Piscataway, NJ, USA, IEEE, US, 2003, pp. 33-38, XP010639540 ISBN: 0-7803-7740-0 abstract p. 33, col. 2, last paragraph—p. 34, col. 2, paragraph 1 p. 37, col. 1, last paragraph.
"A Drowsy Driver Detection System for Heavy Vehicles" by Richard Grace, Vicky Byrne, Damian Bierman, Jean-Michel Legrand, David Gricourt, Robert Davis, James Staszewski and Brian Carnahan 0-7803-5086-3/98 © 1998 IEEE, pp. I36-1 through I36-8.

(Continued)

*Primary Examiner*—Vikkram Bali
*Assistant Examiner*—Daniel Zeilberger
(74) *Attorney, Agent, or Firm*—Jimmy L. Funke

(57) ABSTRACT

A system and method are provided for detecting one or both eyes of the driver of a vehicle. The system includes a video imaging camera oriented to generate images of the driver's face. The system also includes a video processor for processing the images generated with the video imaging camera. Filters are applied to each of potential eye candidates to determine which candidates represent an eye, weighted values are assigned to the filtered eye candidates, and an eye is detected based on the weighting of each eye candidate. According to one aspect, different size patches of potential eye candidates are processed and compared to models.

16 Claims, 13 Drawing Sheets

OTHER PUBLICATIONS

"Drowsy Driver Monitor and Warning System" by Richard Grace, International Driving Symposium on Human Factors in Driver Assessment, Training and Vehicle Design, Aug. 2001, 7 pages.

"Research On Vehicle-Based Driver Status/Performance Monitoring; Development, Validation, And Refinement Of Algorithms For Detection Of Driver Drowsiness," U.S. Department of Transportation, National Highway Traffic Safety Administration, Dec. 1994.

"Communication Via Eye Blinks—Detection and Duracation Analysis in Real Time," by Kristen Grauman, Margrit Betke, James Gips and Gary R. Bradski, Computer Vision and Pattern Recognition Conference IEEE, pp. I-1010-I-1017, © 2001.

"Localized Principal Component Analysis Learning for Face Feature Extraction and Recognition," by Irwin King and Lei Xu, The Chinese University of Hong Kong, pp. 1-5, 1997.

* cited by examiner

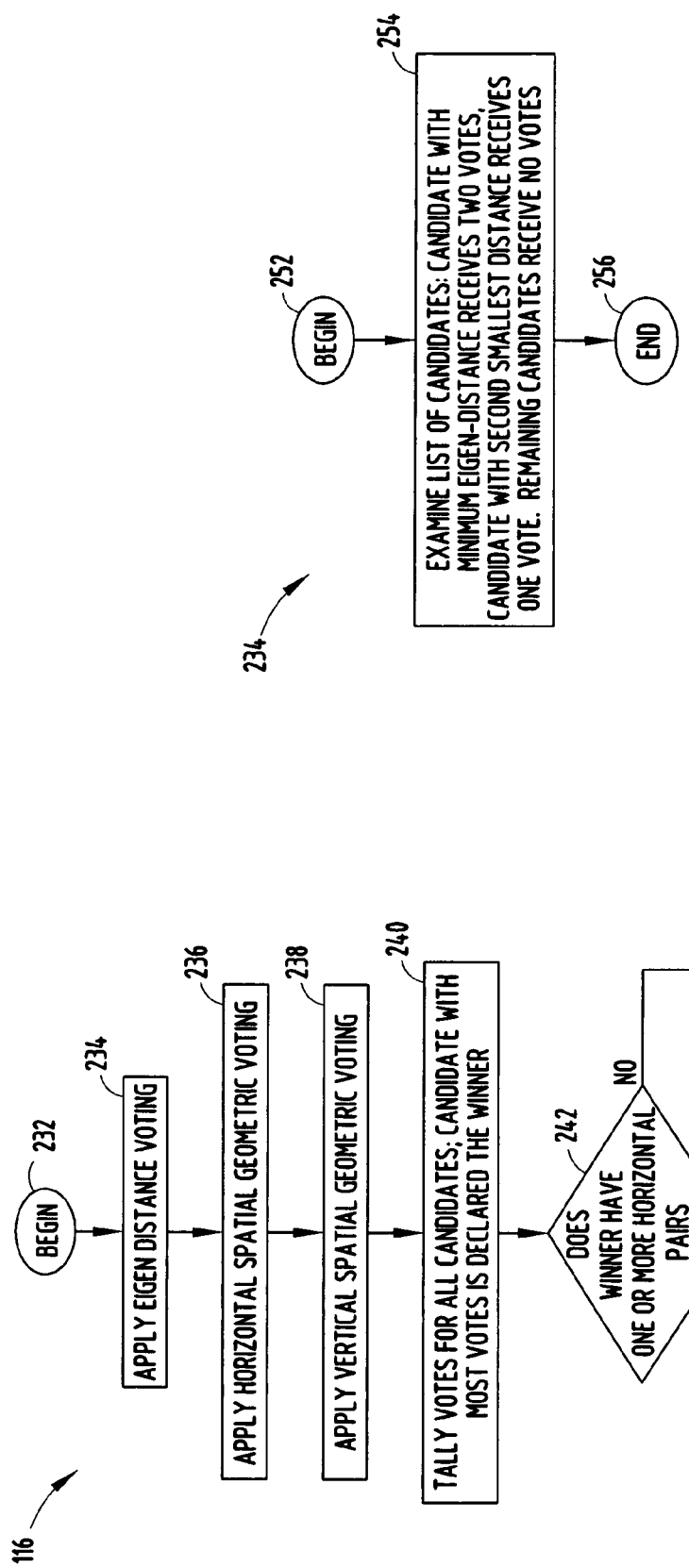

SYSTEM AND METHOD FOR DETECTING AN EYE

TECHNICAL FIELD

The present invention generally relates to eye monitoring and, more particularly, relates to detecting an eye, such as one or both eyes of a driver of a vehicle.

BACKGROUND OF THE INVENTION

Video imaging systems have been proposed for use in vehicles to monitor a subject person, such as the driver of the vehicle. Some proposed video imaging systems include one or two cameras focused on the driver to capture images of the driver's face. The video images are processed generally using computer vision and pattern recognition techniques to determine various facial characteristics of the driver including position, orientation, and movement of the driver's eyes, face, and head. Some advanced eye monitoring systems process the captured images to determine eye closure, such as open, half-open (half-closed), and closed states of the eye(s).

By knowing the driver's facial characteristics, vehicle control systems can provide enhanced vehicle functions. For example, a vehicle control system can monitor one or both eyes of the subject driver and determine a condition in which the driver appears to be fatigued or drowsy based on simple statistical analysis of the cumulated results of open or closed state of the eye(s) over time. Standard human factor measures such as PerClos (percentage of eye closure) and AveClos (average of eye closure) could be used to determine the drowsiness state of the driver. For instance, if the AveClos value is determined to be above a certain threshold, the system may initiate countermeasure action(s) to alert the driver of the driver drowsy condition and/or attempt to awaken the driver.

In a typical driver eye state monitor system, the system generally detects the face of the subject driver, analyzes the facial characteristics to determine potential eye candidates, and then detects and tracks one or both eyes of the driver, before processing individual characteristics of the eye, such as eye closure state, eye gaze directivity, etc. In prior known approaches, it has been difficult to automatically detect an eye of an individual subject, due to variations in light and head rotation. In prior known conventional approaches, eye detection often suffers from false detections of eye patterns, and generally requires subject calibration and full visibility of the driver's face.

It is therefore desirable to provide for a cost affordable and effective method for monitoring the face of a subject and detecting the eye(s). In particular, it is desirable to provide for an eye monitoring system for detecting the eye(s) of a driver of a vehicle that overcomes drawbacks of prior known proposed eye detection approaches.

SUMMARY OF THE INVENTION

In accordance with the teachings of the present invention, a system and method are provided for monitoring a subject and detecting an eye. According to one aspect of the present invention, the system includes a video imaging camera oriented to generate images of a subject face. The system further includes a processor for processing the images generated with the video camera. An image of the face of a subject is generated with the video imaging camera, and potential eye candidates are detected. The potential eye candidates are filtered based on appearance and assigned a weighted value to each eye candidate based on the appearance. Potential eye candidates are also filtered based on spatial-geometrical constraints, and a weighted value is assigned to eye candidates based on the spatial-geometrical constraints. The eye candidates are further filtered based on physiological skin properties, and weighted values are further assigned to eye candidates based on the physiological skin property. This system and method detects an eye based on the weighted values of the eye candidates.

According to another aspect of the present invention, a system and method are provided for detecting an eye. The system employs a video imaging camera and a processor. The method includes the steps of generating an image of a face of a subject and detecting potential eye candidates from the image. A first size patch of the image of each potential eye candidate is compared to a first model based on pattern recognition and a value is assigned to each eye candidate based on the image recognition. A second size patch of the image of each potential eye candidate having a different second size is compared to a second model based on pattern recognition, and a second value is assigned to each of the eye candidates based on the image recognition. An eye is detected based on the first and second values of the eye candidates.

Accordingly, the eye detection system and method of the present invention effectively detects one or both eye(s) of a subject with a cost affordable and real-time eye monitoring system. The eye monitoring system is particularly useful in a vehicle for monitoring the eye(s) of a driver of the vehicle and detecting one or both of the driver's eye(s).

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which:

FIG. 12 is a flow diagram illustrating further steps of weighting the potential eye candidates for voting;

FIG. 13 is a flow diagram illustrating the steps of selecting the maximum weighted eye candidate;

DESCRIPTION OF THE PREFERRED EMBODIMENT

Figure 1:
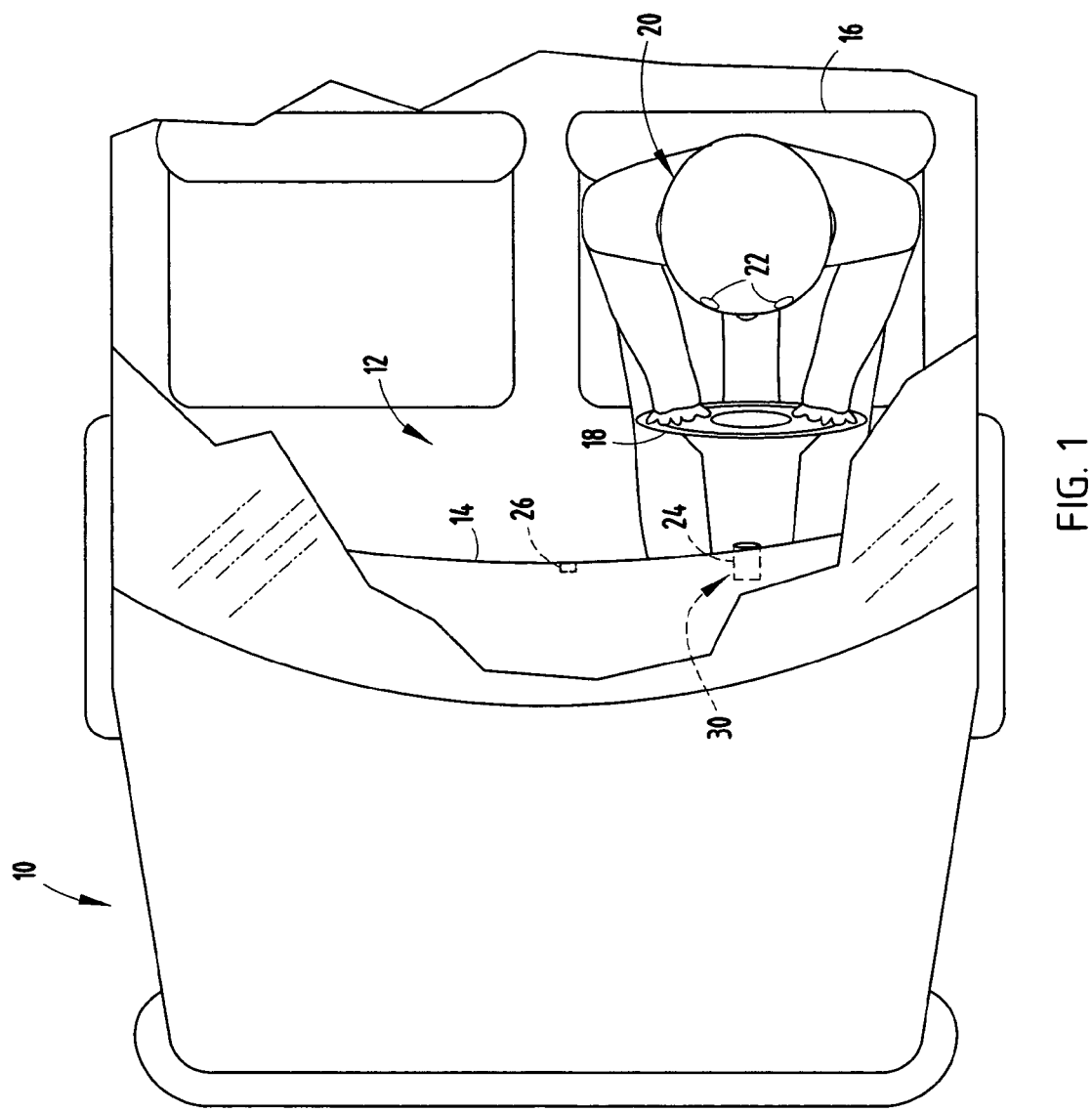
FIG. 1 is a top view of the cockpit of a vehicle equipped with an eye monitoring system for monitoring the eye(s) of a driver.

Referring now to FIG. 1, the passenger compartment (cockpit) 12 of a vehicle 10 is generally shown equipped with a driver eye monitoring system 30. The eye monitoring system 30 has a video imaging camera 24 oriented and focused on a subject person (driver) 20 operating the vehicle 10. The camera 24 captures and generates video images of the face of the subject driver 20. The eye monitoring system 30 monitors the face of the subject person 20 and detects one or both eyes 22 according to the present invention. The eye monitoring system 30 may further track the detected eye(s), determine a state of the eye, e.g., open eye state or closed eye state, and use the determined eye state in one or more vehicle applications (e.g., driver drowsy detection).

The video imaging camera 24 is shown located generally in front of the driver's seat 16 in the front region of the vehicle cockpit 12. According to one embodiment, video imaging camera 24 is mounted in the instrument cluster. However, the camera 24 may be located at other locations onboard the vehicle 10 which allow for acquisition of video image(s) capturing one or both eyes of the subject driver 20 of the vehicle 10. For example, the video imaging camera 20 may be mounted in the steering assembly 18 or mounted in the dash 14. While a single video imaging camera 24 is shown and described herein, it should be appreciated that two or more video imaging cameras may be employed in the eye monitoring system 30, without departing from the teachings of the present invention.

The video imaging camera 24 is arranged so as to capture successive video image frames of the region where the face of the subject driver 20 of the vehicle 10 is expected to be located during normal vehicle driving. More particularly, the acquired video image frames capture the driver's face including one or both eyes 22 and the surrounding ocular features generally found in the area referred to as the ocular adnexa. These features may include one or both eyes 22 and the pupil of the eyes 22, the upper (superior) and lower (inferior) eyelids, and the palpebral fissure space between the eyelids. The acquired video image(s) are then processed to detect one or both eyes 22 for further processing.

Each video frame image is processed to detect one or both eyes 22 of the driver 20. The detected eye(s) 22 may be further processed to determine the eye closure state of one or both eye(s) 22 of the driver 20, such as open eye position or closed eye position states. By knowing the eye closure state, the eye monitoring system 30 allows for determination of a driver drowsiness condition, among other uses. The detected eye(s) 22 may be processed to determine eye gaze vector(s) which can be used to detect an inattentive driver condition.

The eye monitoring system 20 is also shown employing an optional light illuminator 26 located forward of the driver 20, such as in the dash 14, for illuminating the face of the driver 20. The light illuminator 26 may include one or more infrared (IR) light emitting diodes (LEDs). Either on-axis of off-axis LEDs may be employed (e.g., no specific IR setup is required, in particular). The light illuminator 26 may be located anywhere onboard the vehicle 10 sufficient to supply any necessary light illumination to enable the camera 24 to acquire video images of the driver's eye(s) 22.

Figure 2:
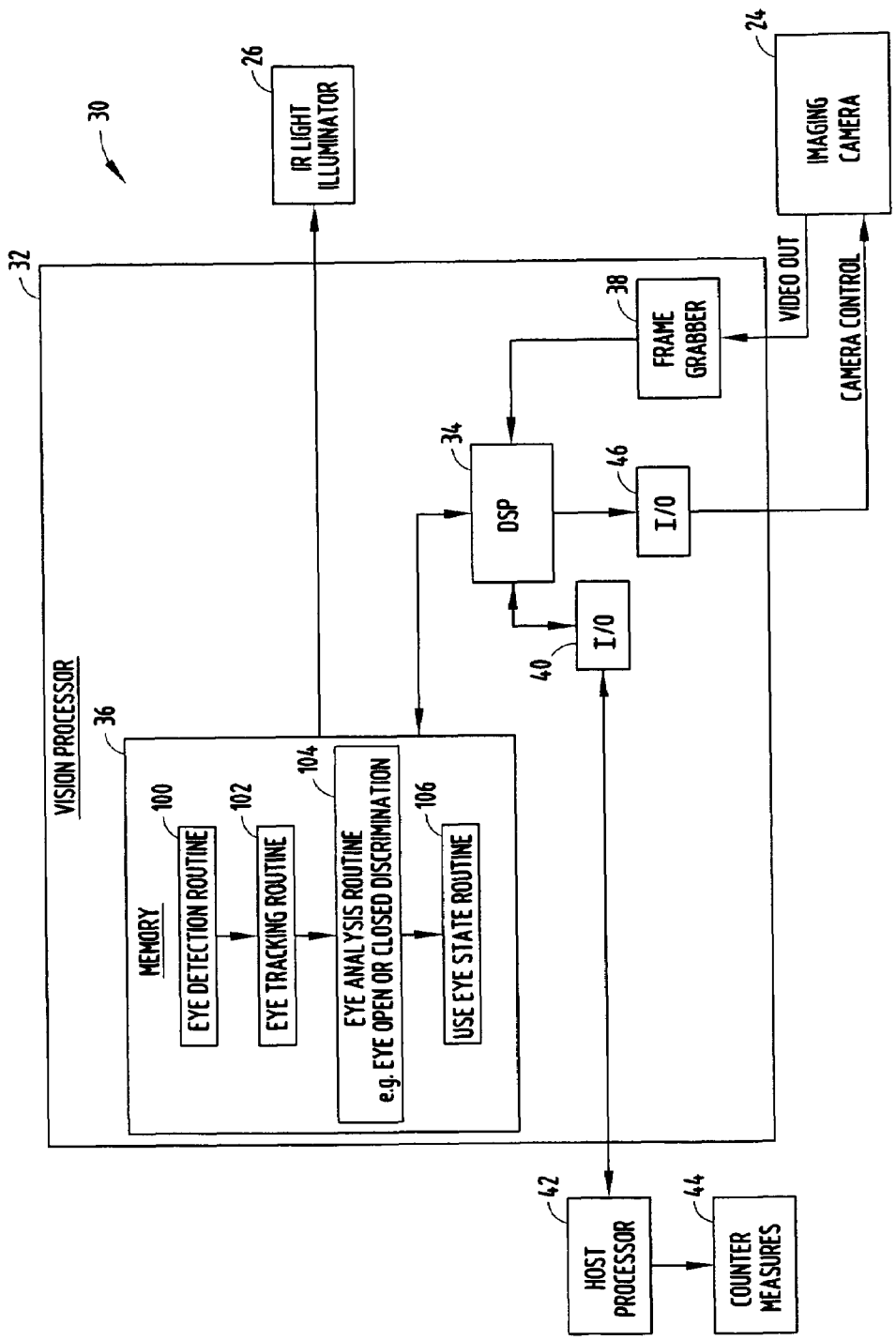
FIG. 2 is a block diagram illustrating the eye monitoring system according to the present invention.
Figure 4:
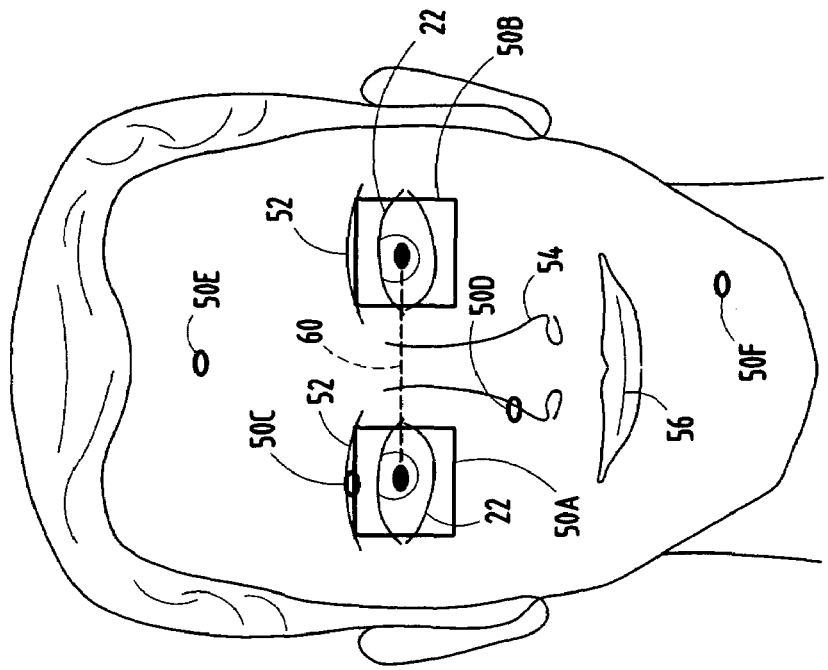
FIG. 4 is a pictorial representation of a video image captured by the camera showing potential eye candidates of the driver and further illustrating a horizontal pair of eye candidates.

Referring to FIG. 2, the eye monitoring system 30 is shown having the video imaging camera 24 and IR light illuminator 26 coupled to a vision processor 32 which, in turn, is coupled to a host processor 42. The video imaging camera 24 may include a CCD/CMOS active-pixel digital image sensor mounted as a chip onto a circuit board. One example of a CMOS active-pixel digital image sensor is Model No. PB-0330, commercially available from Photobit, which has a resolution of 640 H×480 V. It should be appreciated that other imaging cameras may be employed.

The vision (video) processor 32 is shown having a frame grabber 38 for receiving the video output frames generated by the video imaging camera 24. Vision processor 32 also includes a digital signal processor (DSP) 34 for processing the acquired video image frames. The digital signal processor 32 may be a floating point or fixed point processor. The vision processor 32 further includes memory 36, such as random access memory (RAM), read-only memory (ROM), and other volatile and non-volatile memory, as should be readily apparent to those skilled in the art. The vision processor 32 is configured to perform one or more routines for controlling activation of the IR light illuminator 26, controlling the video imaging camera 24, processing the acquired video images to detect one or both eyes, further processing the detected eyes to determine eye state, such as eye closure, and applying the processed information to vehicle control systems, such as may be implemented on host processor 42.

The vision processor 32 may provide camera control functions via control input/output (I/O) logic 46 which allows for control of the video imaging camera 24 via camera control signals. Control of the video imaging camera 24 may include automatic adjustment of the pointing orientation of the video imaging camera 24. For example, the video imaging camera 24 may be repositioned to focus on an identifiable feature, and may scan a region in search of an identifiable feature, including the driver's face and, more particularly, one or both eyes 22. Camera control may also include adjustment of focus exposure, gain and/or magnification as may be necessary to track an identifiable feature. Thus, the eye monitoring system 30 may automatically locate and track one or more identifiable features, such as one or both of the driver's eyes 22.

The eye monitoring system 30 includes an eye detecting routine 100 stored in memory 36 and processed by the digital signal processor 34. Routine 100 may be implemented as a software program as should be evident to those in the art. The eye detection routine 100 processes the captured video images of the eye 22 to detect one or both eyes 22 by processing potential eye candidates and selecting the eye(s) from the candidates.

Also stored within memory 36 and processed by digital signal processor 34 may be various routines for tracking the detected eye(s), analyzing the eye(s) state and using the eye state. These routines include an eye tracking routine 102, an eye analysis routine 104, and an eye state use routine 106. Any of a number of eye tracking routines may be employed which track the one or both eyes 22 detected in the captured video image(s). Any known eye analysis routine 104 may be employed to analyze the detected and tracked eye(s). For example, eye analysis routine 104 may include an open or closed eye discrimination routine for determining the state of eye closure. According to one example, the eye closure determination may be achieved by monitoring the edge boundaries of the monitored eye 22 as disclosed in U.S. Pat. No. 7,253,739, and entitled "SYSTEM AND METHOD FOR DETERMINING EYE CLOSURE STATE," the entire disclosure of which is hereby incorporated herein by reference.

The eye state use routine 106 may include any known routine for using the analyzed eye information. One example of an eye state use routine 106 is a driver drowsy routine for detecting when the driver of the vehicle appears drowsy, such that corrective action may be taken. According to another example, eye state use routine 106 may determine eye gaze vectors for determining an inattentive driver.

The determined and processed eye information may be made available to a host processor 42 via input/output (I/O) 40. The host processor 42 may include any of a number of control devices that may employ the determined eye information for use in any of a number of applications. For example, the determined eye closure state may be used in a driver drowsy application, inattentive driver application, or other application(s) to initiate countermeasures 44. Examples of countermeasures 44 may include activating an audible warning, initiating a haptic seat, increasing vehicle following distance, initiating cold air conditioning (A/C), and/or activating peppermint olfactory stimulation.

The eye state monitoring system 30 and method 100 detects the presence and two-dimensional (2D) position of the center of one or both eyes in an input video image of the driver's face by processing the image present in each video frame. This includes initially obtaining potential eye candidates using a salient feature detector and/or an image segmentation algorithm. Potential eye candidates are generally dark features, such as eyebrows, nostrils, iris, pupils, and eye sockets. The potential eye candidates are filtered first using an appearance-based approach. Additionally, skin, eyebrow, and spatial-geometrical filters are applied (sequentially or in parallel) to each potential eye candidate. Based on the filtering, weighted values are assigned to each potential eye candidate and the potential eye candidate with the highest number of votes is extracted for further processing. The further processing includes applying a multi-resolution appearance-based filter as described herein.

The eye monitoring system 30 and method 100 processes the video images captured by the video imaging camera 24 which generally captures the face of the driver 20 of the vehicle 10. In one embodiment, the video images are gray scale infrared (IR) images captured by a video camera 24 having a resolution of 640×480 pixels. Representative video images generated with the video imaging camera 24 capturing the driver's face 20 are shown in FIGS. 3-6, according to one example. From a video image, potential eye candidates, such as eye candidates 50A-50F are initially detected. Potential eye candidates may be detected using any known approach such as a salient feature detector for detecting salient features that could potentially be eyes. Potential eye candidates may include receptive or dark holes detected in the video image according to one example. The receptive or dark holes may be extracted by employing a filter based on gray scale image recognition. Any known video processing technique may be employed for detecting potential eye candidates in the captured video images.

Figure 3:
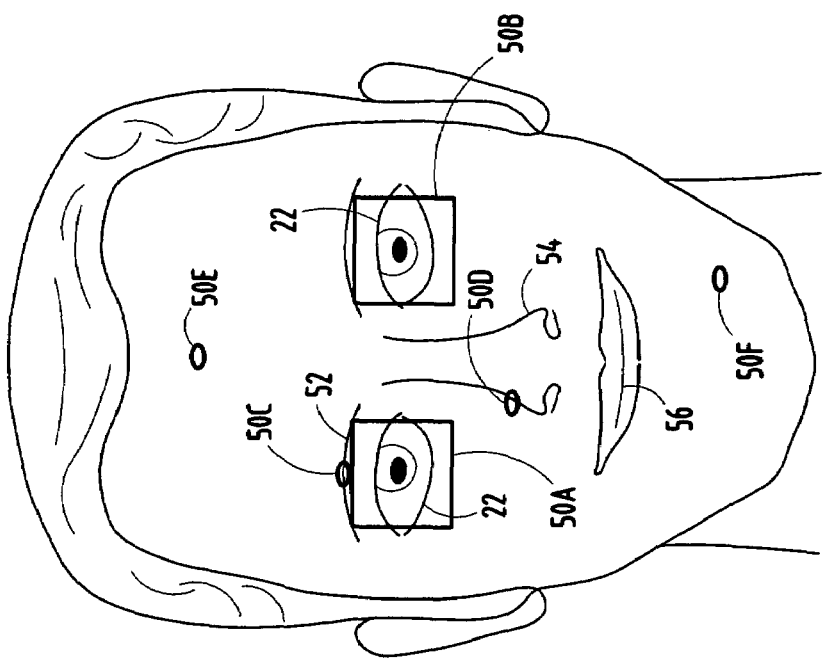
FIG. 3 is a pictorial representation of a video image captured by the camera showing potential eye candidates of the driver.

As seen in FIG. 3, the potential eye candidates 50A-50F may include prominent facial features such as the eyes 22, eyebrows 52, mouth 56, nose 54, and other facial features that exhibit some similarity to an eye sufficient to be considered as a potential candidate of the eye.

An appearance-based filter is applied to the potential eye candidates to compare the candidates with eye and non-eye models. The appearance-based filter may employ an Eigen analysis approach according to one embodiment and defines a confidence level of rejection of eye candidates. An image patch P of a first size, such as 41×41 pixels, is analyzed. Each potential eye candidate is compared to an eye model and a non-eye model. The distances from each potential eye candidate to each of the eye and non-eye models in an Eigen space are defined as distance $d1$ and $d2$, respectively. The absolute value of the difference between distances $d1$ and $d2$ is compared to a threshold margin of separation. According to this embodiment, if $|d1-d2|$ is greater than the threshold and $d1$ is less than $d2$, then the candidate is classified as strong eye. If $|d1-d2|$ is less than the threshold and $d2$ is greater than $d1$, then the candidate is classified as strong non-eye. Otherwise, the candidate is classified as weak eye.

The appearance-based filter rejects, assigns zero vote, or assigns one vote if the candidate is strong non-eye, weak eye or strong eye, respectively. Any strong non-eye candidates are eliminated as they are very far from the overlapping region between the eye and non-eye spaces. The remaining candidates of both strong eye and weak eye confidence, are retained for further processing. As a result, eye candidates are kept that may be eyes, but are not well discriminated based on the appearance-based approach.

The eye candidates are also filtered based on spatial-geometrical constraints. This includes filtering the potential eye candidates output from the appearance-based filter. With each potential eye candidate represented in two-dimensional coordinates in an image plane, such as is shown in FIG. 3, pairs of candidates that validate horizontal spatial constraints are found. The first spatial constraint may be defined in terms of horizontal distance between two eye candidates, such as Euclidian distance $X(p)$, $X(p') \leq TH$, wherein TH is a threshold equal to X (horizontal) pixels. This horizontal spatial constraint links mainly a pair of eyes that are expected to be in a horizontal alignment within an acceptable margin of 2D head rotations (head tilt) of the subject driver.

The spatial-geometrical constraint filter also locates a pair of candidates that validate a horizontal geometrical constraint according to the following equation:

arctan $(|Y(p)-Y(p')|/|X(p)-X(p')|) \leq TH$, wherein TH is equal to a small angle, e.g., ten degrees (10°). This horizontal spatial constraint links mainly a pair of eyes that are expected to be in a horizontal alignment on the subject driver. The horizontal alignment may take into consideration a head tilted at an angle.

The spatial-geometrical constraints filter also locates pairs of candidates that validate a vertical spatial constraint. The vertical spatial constraint may be defined in terms of vertical distance between two candidates, such as Euclidian distance $Y(p)$, $Y(p') \leq TH$, wherein TH is a threshold is equal to Y (vertical) pixels. The vertical alignment may also take into consideration a head tilted at an angle.

The spatial-geometrical constraints filter further locates a pair of candidates that validate a vertical geometrical constraint according to the following equation:

arctan $(|Y(p)-Y(p')|/|X(p)-X(p')|) \geq TH$, with TH equal to a large angle, e.g., seventy-five degrees (75°). These vertical spatial constraints are mainly used to link an eye and eyebrow together, which are known to be in a vertical alignment on a subject driver.

Following finding the pairs of horizontal and vertical geometrical constraints, the spatial-geometrical constraint filter assigns a vote (weighting) to each pair of eye candidates that validates each of the horizontal and vertical constraints. That is, if the horizontal constraint is met, the pair of eye candidates that meets the horizontal constraint are assigned a vote to increase the weighting of each such eye candidate. Similarly, if a pair of vertical eye candidates is validated, then the lower vertical eye candidate is assigned a vote to increase the weighting of such eye candidates, while the upper vertical eye candidate does not receive a vote (since it is potentially an eyebrow).

The eye detection system and method further include applying a physiological infrared-skin filter to filter the potential eye candidates output from the spatial-geometrical constraints filter based on physiological infrared-skin reflection response properties. This filter processes unique geometrical relationship and visual appearance between human eyes and skin-face to enhance the discrimination processed between eye and non-eye candidates in the filtering stage of the detection process. The proposed filter assumes a pair of potential eye candidates is given at a certain step of the weighted-based approach.

According to one embodiment, the physiological infrared-skin property filter extracts an image patch P of a certain size (e.g., 41×41 pixels) at the midpoint of a pair of eye candidates and computes an average brightness of the image patch which represents physiological properties. If the average brightness of the image patch is larger than a fixed threshold, a vote is assigned to each of the pair of eye candidates.

Figure 6:
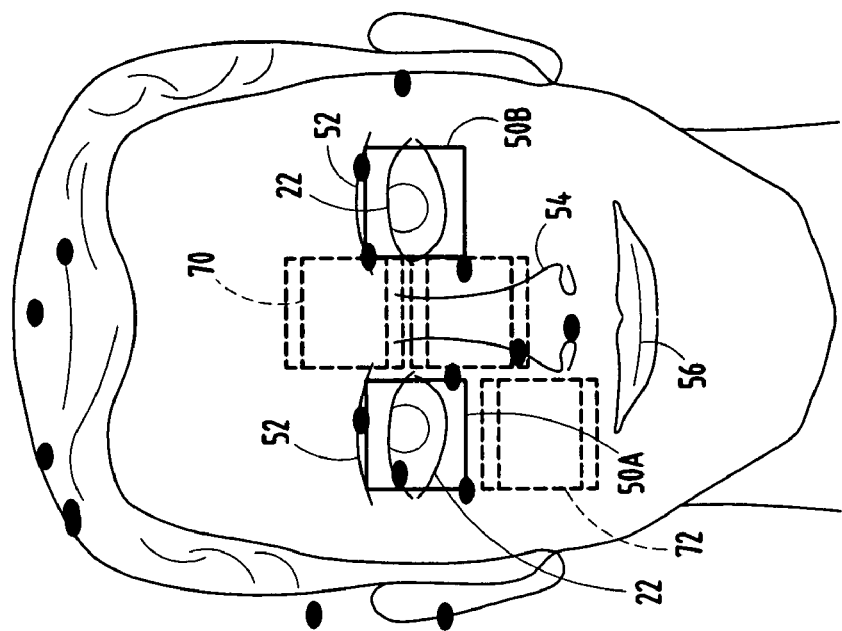
FIG. 6 is a pictorial representation of a video image captured by the camera showing potential eye candidates of the driver and further illustrating physiological skin features and filtering.
Figure 5:
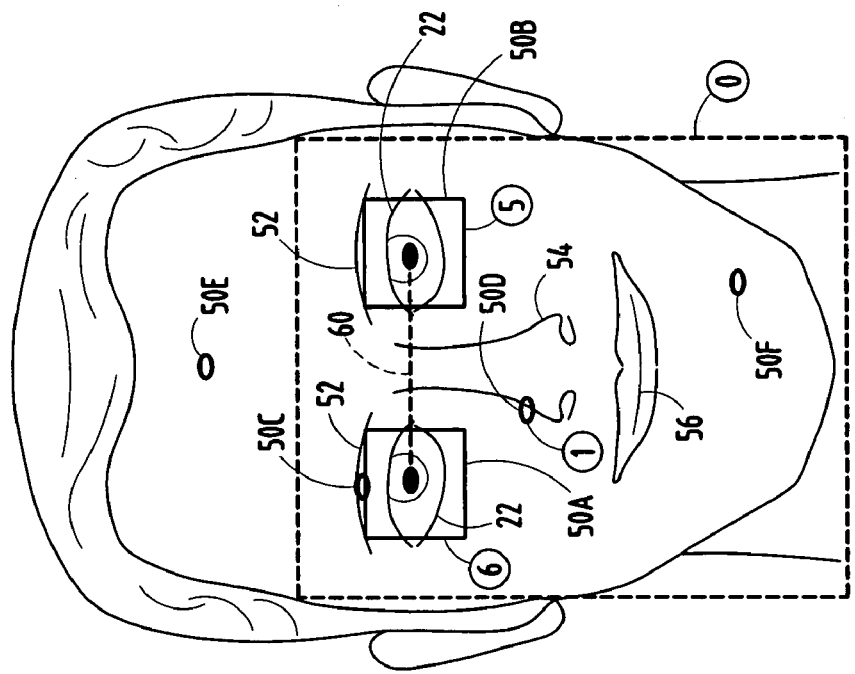
FIG. 5 is a pictorial representation of a video image captured by the camera further showing potential eye candidates of the driver.

Next, an angle of inclination is computed between both eye candidates relative to a horizontal line in the two-dimensional image plane. Considering the midpoint and origin, a perpendicular segment of D pixels is drawn to the line joining the two elements of the pair of eye candidates. A patch 70 of a certain size (e.g., 41×41 pixels) is then extracted, and may be referred to as the forehead position of the face as seen in FIG. 6.

Considering the center of the left eye is an origin, a perpendicular segment of D pixels is drawn to the line joining the two elements of the pair of eye candidates. A patch 72 of a certain size (e.g., 41×41 pixels) is then extracted and is referred to as the cheek position patch. Next, an average brightness of each forehead position patch 70 and cheek position patch 72 is computed.

If the average brightness of both the forehead and cheek position patches 70 and 72 is not larger than a threshold, no additional votes are given to the pair of eye candidates. If the average brightness of both the forehead and cheek position patches 70 and 72 is larger than a threshold, then the following additional steps are performed. Each of the forehead and cheek patches 70 and 72 are split into two horizontal blocks, and the gray-scale histogram of each block of the cheek and forehead patches 70 and 72 are computed. Next, the statistical normalized Chi-square distance between corresponding blocks of the forehead and cheek patches 70 and 72 is computed in order to estimate the similarity between skin blocks. The theoretical range of this distance is expected to be between zero and two. According to alternative embodiments, other types of similarity measurements could be applied, such as histogram intersection and Euclidian distance measurements. If one of the computed distances between corresponding blocks (in the implementation shown, each skin patch is split into upper and lower blocks, therefore two distances are computed) is less than a predefined threshold, e.g., 0.8, then a vote is assigned to each of the pair of potential eye candidates. Such process allows for computation of the similarity between image blocks locally and therefore the system is tolerant to some extreme local lighting changes in the image.

The above-described sequentially applied filters contribute to the selection of the final winner in a weighted-based approach for eye detection. One vote is added if a pair of eye candidates has a bright midpoint and another vote is gained if both the forehead and cheek patches 70 and 72 are above the average brightness level of infrared-skin, and the forehead and cheek patches 70 and 72 are correlated.

Following completion of the above-described appearance, spatial-geometrical and physiological infrared-skin filters, the system and method compares the weighted values (votes) of each of the potential eye candidates. This may be performed with a weighted-graph of potential eye candidates in which each node of the graph has attracted a certain number of votes. An election of eye candidates is then taken based on a comparison to select the final one or two candidates based on the number of votes. The final winner is the candidate with the maximum number of votes.

The one or two eye candidates having the most votes are assumed to be the detected eye or eyes that are selected for further processing. The eye monitoring system 30 and method 100 of the present invention further includes a multi-resolution appearance-based refinement routine based on multiple levels of appearance to determine if the highest confidence level winner(s) selected is the eye(s). This is generally achieved by comparing different size patches of the selected eye candidates to corresponding different size patch eye models to determine whether or not each candidate is a strong eye, strong non-eye or weak eye. By comparing different size patches P of the eye candidates to different size eye models, a refined decision can be achieved to detect the one or two eyes 22 of the subject driver 20.

Figure 7:
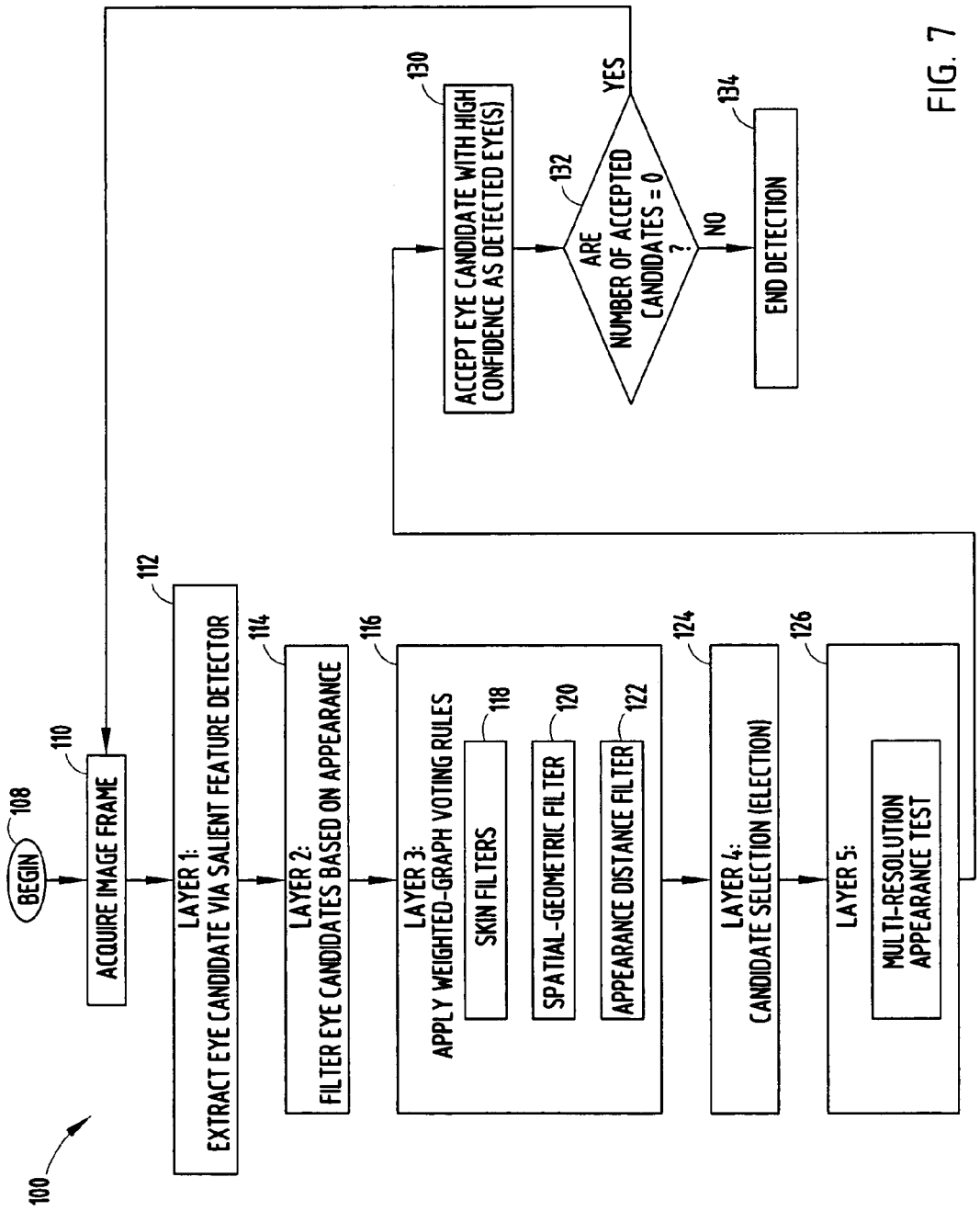
FIG. 7 is a flow diagram illustrating the eye detection routine for detecting an eye according to the present invention.

The eye detection routine 100 is shown in further detail in FIGS. 7-17. With particular reference to FIG. 7, eye detection routine 100 begins at step 108 and proceeds to step 110 to acquire a video image frame generated by the video imaging camera. The video image frame may include a gray scale image of the subject person's face.

Routine 100 processes the acquired video image frame to extract potential eye candidates via a salient feature detector in step 112. Step 112 performs a routine also referred to as layer 1 for extracting the eye candidates. Any known technique may be employed for detecting potential eye candidates, including the use of a salient feature detector for identifying receptive or dark holes that may be potential representations of an eye.

Figure 8:
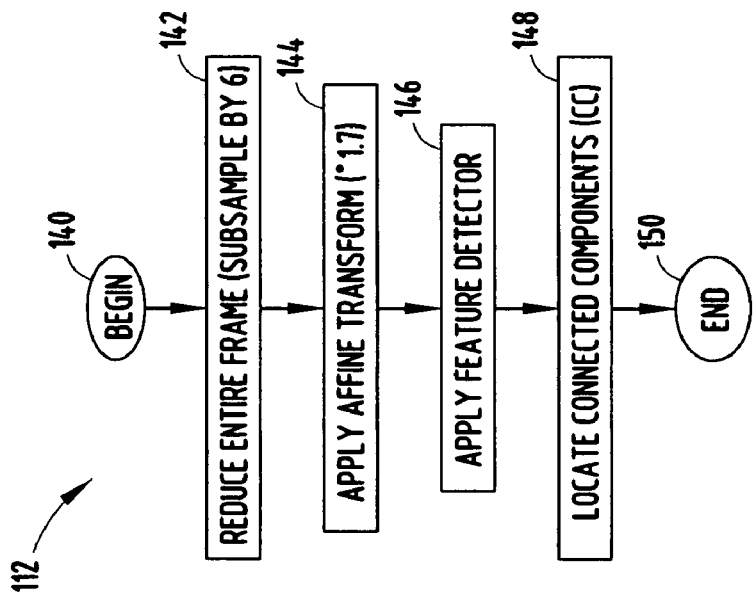
FIG. 8 is a flow diagram illustrating the steps of extracting eye candidates.

Referring to FIG. 8, one example of a routine 112 for extracting eye candidate features with a salient feature detector is illustrated. Routine 112 begins at step 140 and proceeds to reduce the entire video frame by an amount such as six in step 142. An affine transform (*1.7) is then applied in step 144. Next, a feature detector is applied in step 146. The connected components (CC) of a salient feature are then located in step 148 before ending in step 150. It should be appreciated that the connected components have a size and shape that is indicative of a potential eye candidate in the driver image.

Referring back to FIG. 7, the eye detection routine 100 proceeds to step 114 to filter the eye candidates based on appearance. Step 114 performs a routine to achieve the filtering. This may be achieved by employing an image pattern recognition technique for comparing each of the potential eye candidates to one or more predetermined eye models.

Figure 9:
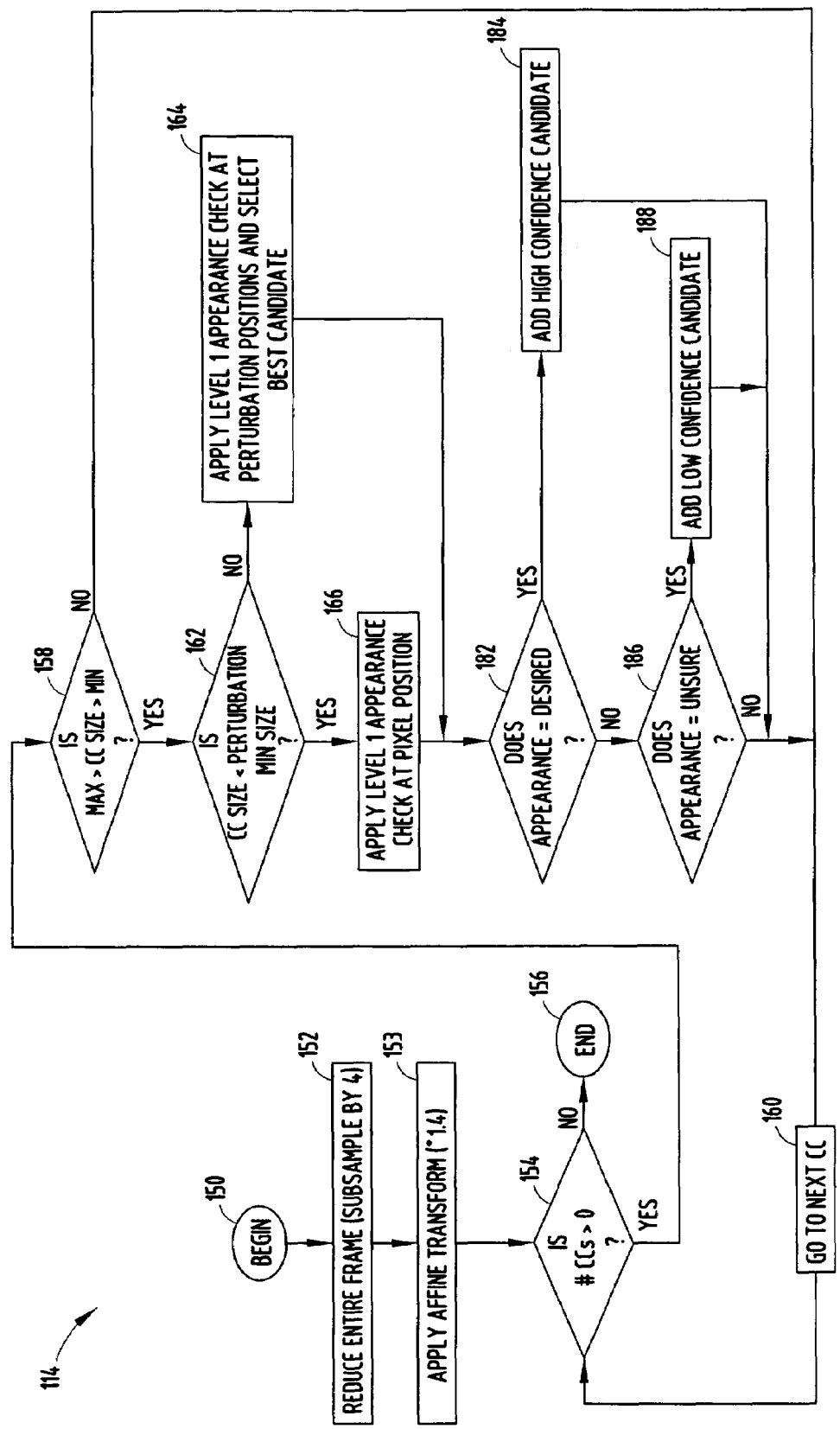
FIG. 9 is a flow diagram illustrating the steps of filtering the eye candidates based on appearance.

Routine 114 is shown in FIG. 9 filtering the candidates (connected components) found in the previous step 112 based on their appearance. Beginning at step 150, routine 114 proceeds to step 152 where the entire frame is reduced by an amount, such as four in order to speed up the extraction process of potential eye candidates. Next, in step 153, an affine transform (*1.4) is applied. Step 154 begins a loop that will iterate over each connected component. When each connected component has been analyzed, routine 114 ends pursuant to step 156.

Otherwise, if connected components remain to be analyzed (i.e., CCs is greater than zero), routine 114 proceeds to decision step 158 to compare the size of the connected components to a minimum and maximum size. If the connected component size is not within the minimum and maximum values, routine 114 proceeds to the next component. If the connected component size is within the minimum and maximum values, routine 114 proceeds to step 162 to determine if the connected component size is less than a perturbation minimum size and, if so, applies a single level one appearance check at the pixel position in step 166.

Only a single appearance check is applied to small connected components, since these points are frequently noise produced by the feature detector. Otherwise, routine 114 applies the level one appearance check at perturbation positions and selects the best candidate in step (routine) 164. Appearance checks are performed at the perturbation positions to accommodate for inaccuracy of feature detection and image sampling, and subsequently to avoid a connected component that is not well centered on a feature from failing the appearance check.

The appearance-based filter routine 114 proceeds to decision step 182 to determine if the appearance (pattern) of each eye candidate is a desired appearance and, if so, adds that eye candidate, with a high confidence (strong eye), to the list of retained candidates in step 184. If the appearance of an eye candidate is not equal to a desired appearance, step 114 proceeds to decision step 186 to see if the appearance is unsure and, if so, adds that eye candidate to the retained list with a low confidence (weak eye) in step 188. All candidates that were classified as undesired are discarded. Routine 114 then goes to the next connected component in step 160 and thereafter returns to step 154.

Figure 10:
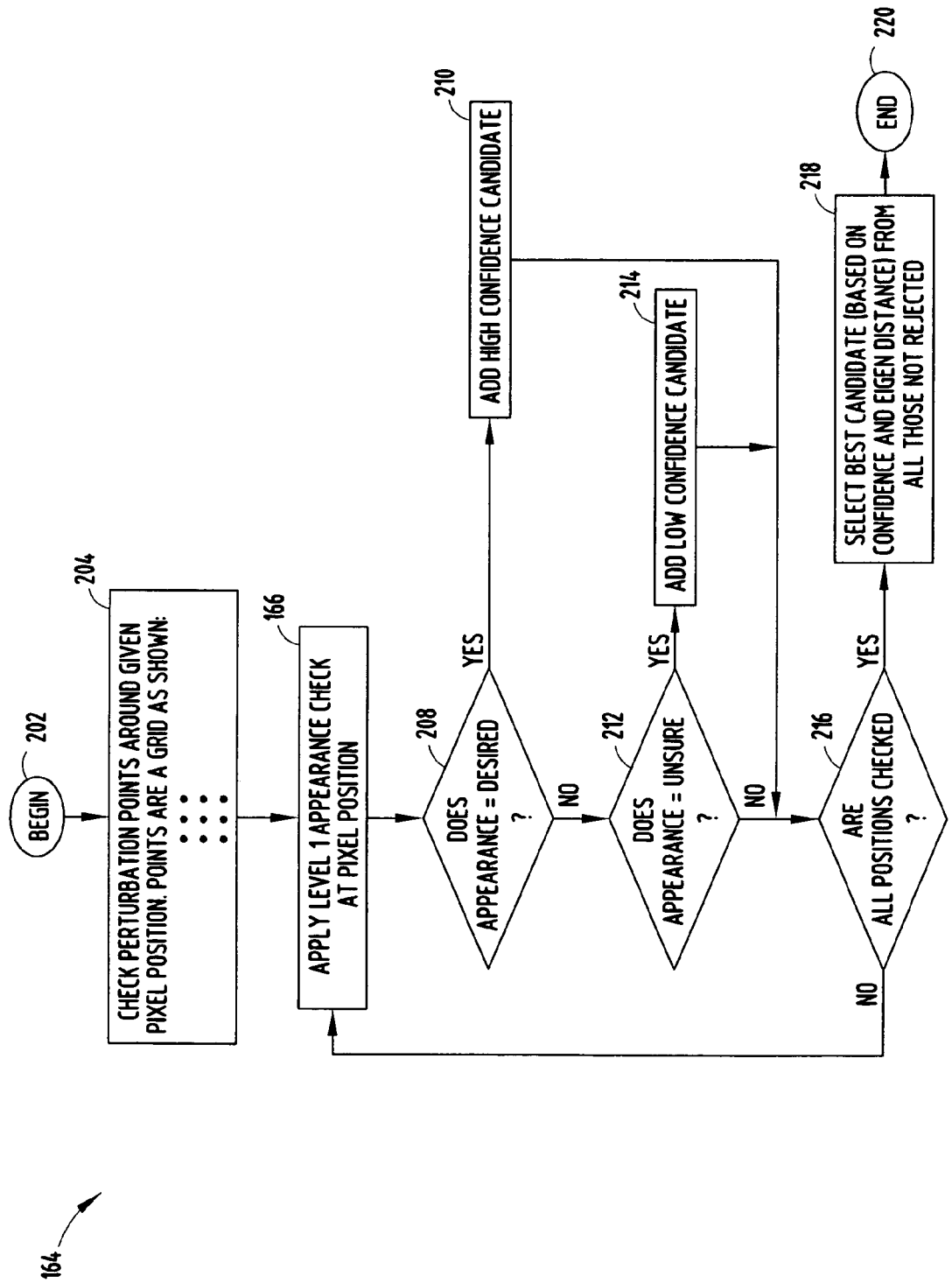
FIG. 10 is a flow diagram illustrating the steps of weighting potential eye candidates.

In FIG. 10, the level one appearance check as perturbations routine 164 is illustrated beginning at step 202 and proceeding to check perturbation points around a given pixel position (root point) in step 204. The root point is the center of the detected salient feature. This may include points around the root point provided in a grid. Next, the level one appearance check is again applied at the pixel location in step 166. In decision step 208, routine 164 determines if the appearance (pattern) of an eye candidate is sufficiently similar to a desired appearance and, if so, adds a high confidence vote to that eye candidate in step 210. If the appearance of an eye candidate is unsure as determined in step 212, routine 164 proceeds to step 214 to add a low confidence vote to that eye candidate. Otherwise, routine 164 proceeds to decision step 216 to check if all positions have been checked and, if so, selects the best eye candidate (based on confidence and Eigen minimum distance) from those eye candidates that are not rejected in step 218, and then ends at step 220.

Figure 11:
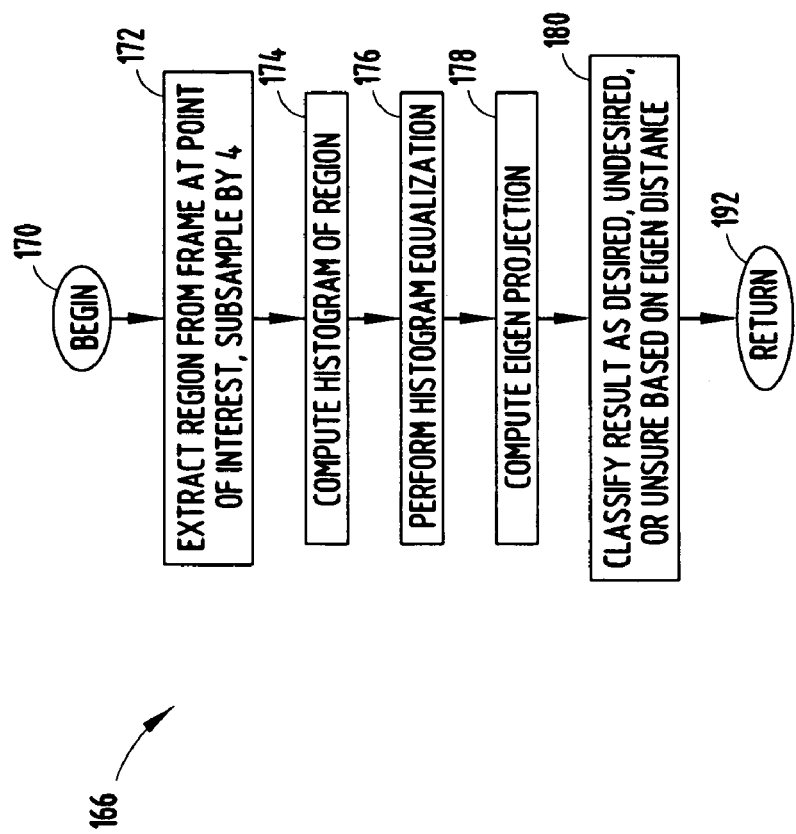
FIG. 11 is a flow diagram illustrating the steps of computing an Eigen-based classification method of an image region (patch)

The appearance-based routine 166 is further illustrated in FIG. 11 beginning at step 170 and proceeding to step 172 to extract a region from the video frame at a point of interest, e.g., subsample by four. Next, in step 174, a histogram of the extracted region is computed. Histogram equalization is then performed in step 176. According to other embodiments, different state-of-the-art contrast enhancement methods could be applied instead of histogram equalization. An Eigen projection computation is performed in step 178, and the results are classified as desired, undesired or unsure based on the Eigen distance in step 180, before returning at step 192.

Referring to FIG. 12, layer three of FIG. 7 with regard to voting is further illustrated by routine 116 beginning at step 232 and proceeding to apply Eigen distance voting in step 234. In step 236, horizontal spatial-geometric voting is applied. Similarly, in step 238, vertical spatial-geometric voting is applied. In step 240, the votes are tallied for all eye candidates, and the eye candidate with the most votes is declared the winner. In decision step 242, routine 116 determines if the winner has one or more horizontal pairs and, if so, selects the runner-up as the winner's pair with the most votes in step 244, before ending at step 246.

Referring to FIG. 13, the voting with regard to Eigen distance for appearance distance filter 122 is further illustrated by routine 234. Routine 234 begins at step 252 and proceeding to step 254 to examine the list of eye candidates. The eye candidate with the minimum Eigen distance (best appearance) receives two votes, the eye candidate with the second smallest distance receives one vote, and the remaining eye candidates receive no votes. This strategy may be applied to extract at maximum the best two eyes. Thereafter, routine 234 is complete at step 256.

Figure 14:
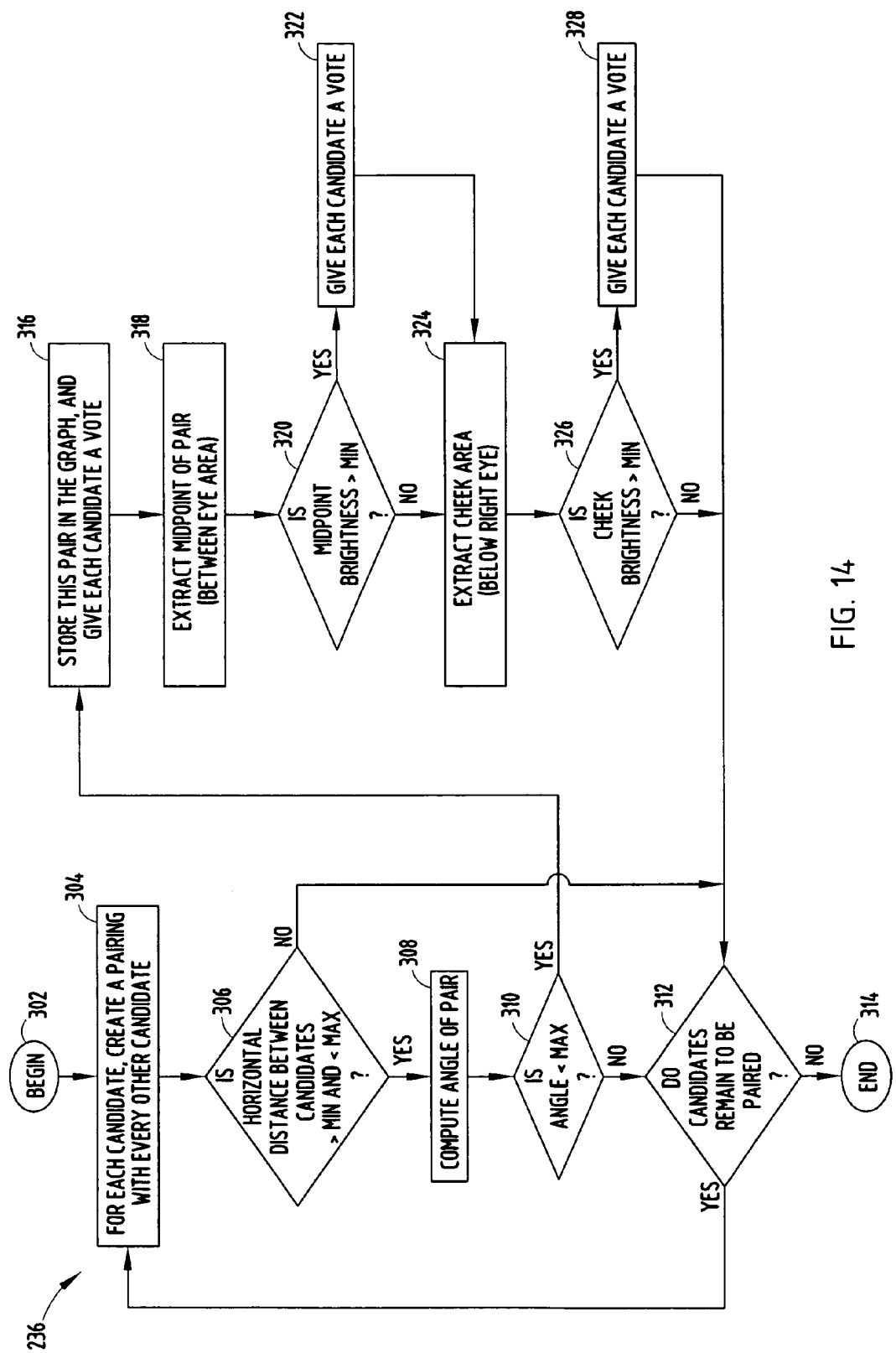
FIG. 14 is a flow diagram illustrating the steps of filtering the eye candidates based on physiological skin properties.

Referring to FIG. 14, the voting selection with respect to the horizontal spatial-geometric filter is further illustrated by routine 236. Routine 236 begins at step 302 and proceeds to step 304 to create a pairing with every other eye candidate for each eye candidate. In decision step 306, routine 236 determines if the horizontal distance between eye candidates is within a range between minimum and maximum values and, if so, computes an angle of the pair of eye candidates in step 308. In decision step 310, the angle of the pair of eye candidates is compared to a maximum angle and, if the angle is greater than or equal to the maximum value, routine 236 proceeds to determine if the eye candidates remain to be paired in step 312 and, if so, returns to step 304. Otherwise, routine 236 is complete at step 314.

If the angle of the pair of eye candidates is less than the maximum angle, routine 236 proceeds to store this pair in a graph and gives each candidate a weighted vote in step 316. Next, in step 318, the midpoint of the pair of eye candidates (between eye area) is extracted. Routine 236 then determines in decision step 320 if the midpoint brightness is greater than a minimum brightness and, if so, gives each candidate a vote in step 322. The cheek area of the face in the image is then extracted (e.g., below the right eye) in step 324. Decision step 326 determines if the cheek brightness is greater than a minimum brightness and, if so, gives each candidate a vote in step 328, before returning to step 312.

Figure 15:
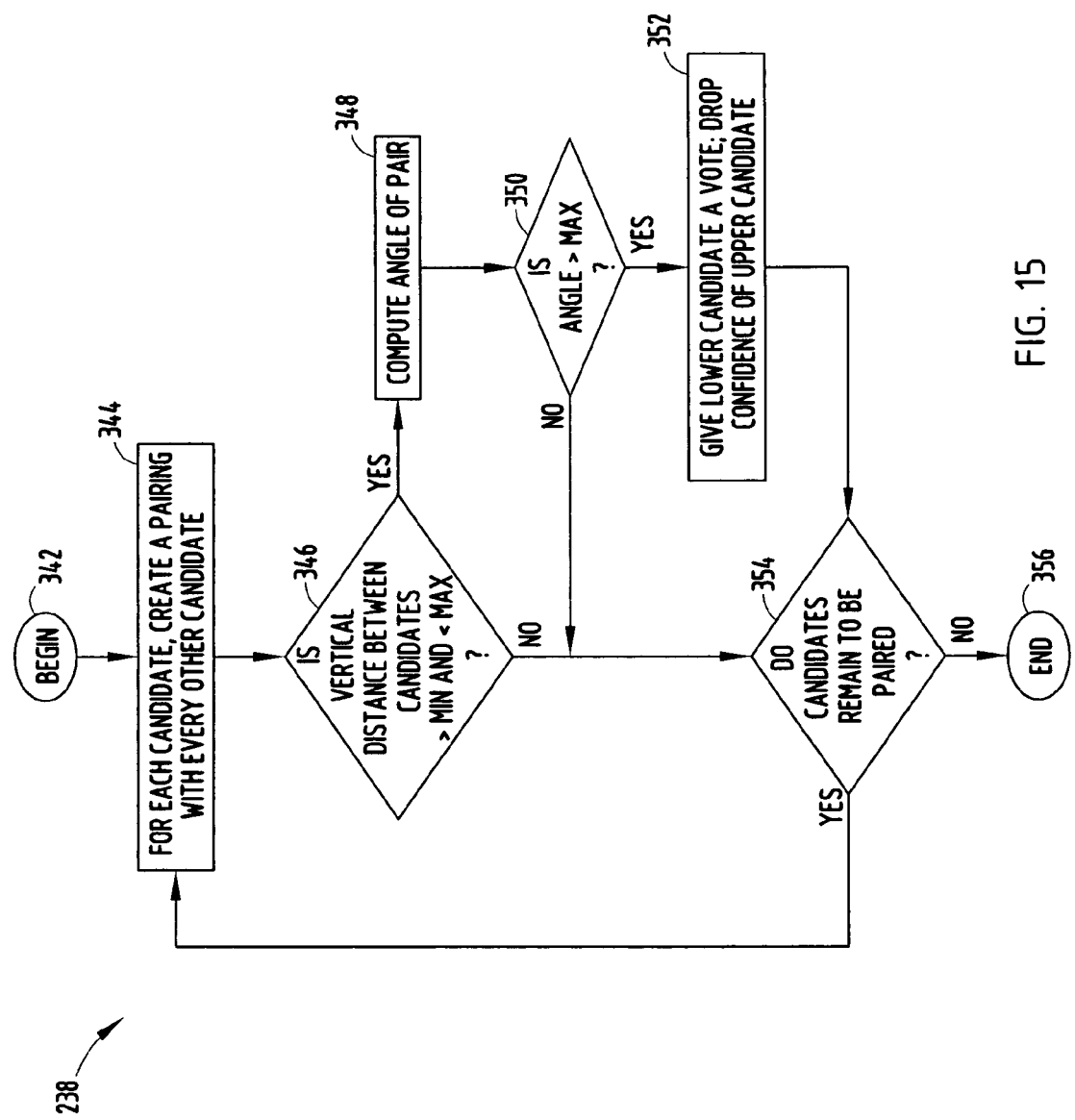
FIG. 15 is a flow diagram illustrating vertical pair filtering.

Referring to FIG. 15, the vertical spatial-geometric constraints filtering and voting are illustrated therein by routine 238. Routine 238 begins at step 342 and proceeds to step 344 to create a pairing with every other eye candidate for each eye candidate. Routine 238 then proceeds to decision step 346 to determine if the vertical distance between eye candidates is between minimum and maximum distances and, if so, computes an angle of the pair of eye candidates at step 348. If the angle of the pair of eye candidates is greater than the maximum angle as determined by decision step 350, then routine 238 proceeds to give the lower eye candidate a vote, and drops the confidence of the upper eye candidate in step 352. Routine 238 then proceeds to determine if the eye candidates remain to be paired in step 354 and, if so, returns to step 344. Otherwise, routine 238 ends at step 356.

Referring back to FIG. 7, the eye detection routine 100 proceeds to layer 4 in step 124 to select the best candidate via election. The votes each candidate accumulated in step 116 are examined, and the candidate with the most votes is selected as the best candidate. The winning candidate will become the detected eye, pending further validation.

The eye detection routine 100 then proceeds to layer 5 in step 126 to perform a multi-resolution appearance test based refinement routine. In this step 126, the eye candidate selected in step 124 is subjected to further appearance tests to further verify that the candidate is indeed an eye.

Figure 16:
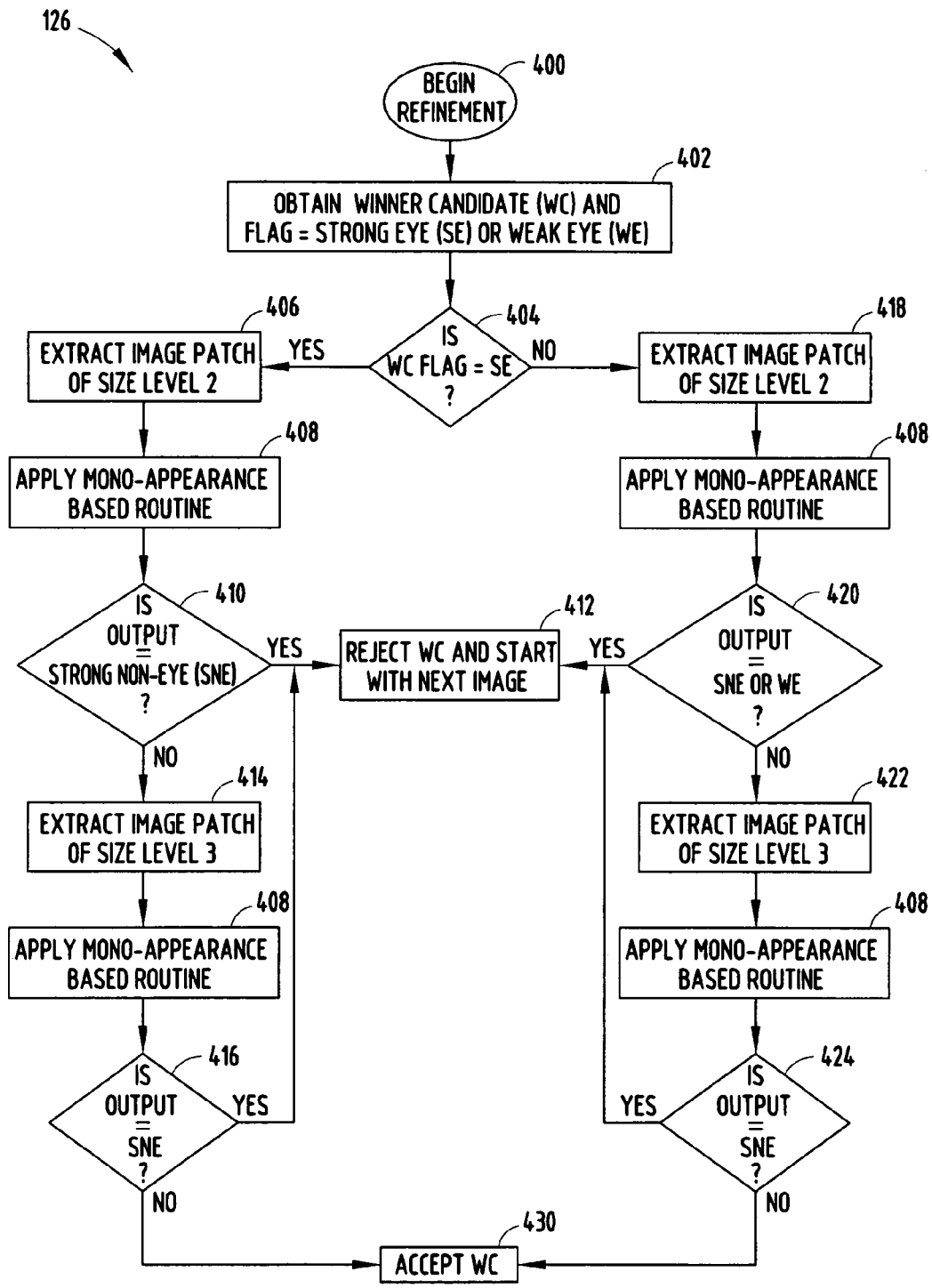
FIG. 16 is a flow diagram illustrating the steps of applying a multi-resolution filter.

Referring to FIG. 16, the multi-resolution appearance test based refinement routine 126 is illustrated in further detail. Routine 126 begins at step 400 and proceeds to obtain the winning candidate (WC) and the corresponding flag which is either equal to strong eye (SE) or weak eye (WE) in step 402. In step 404, routine 126 determines if the winning candidate flag is set equal to strong eye and, if so, extracts an image patch of a second size level (e.g., 64×120 pixels) in step 406. Thereafter, a mono-appearance based routine is applied in step 408.

Figure 17:
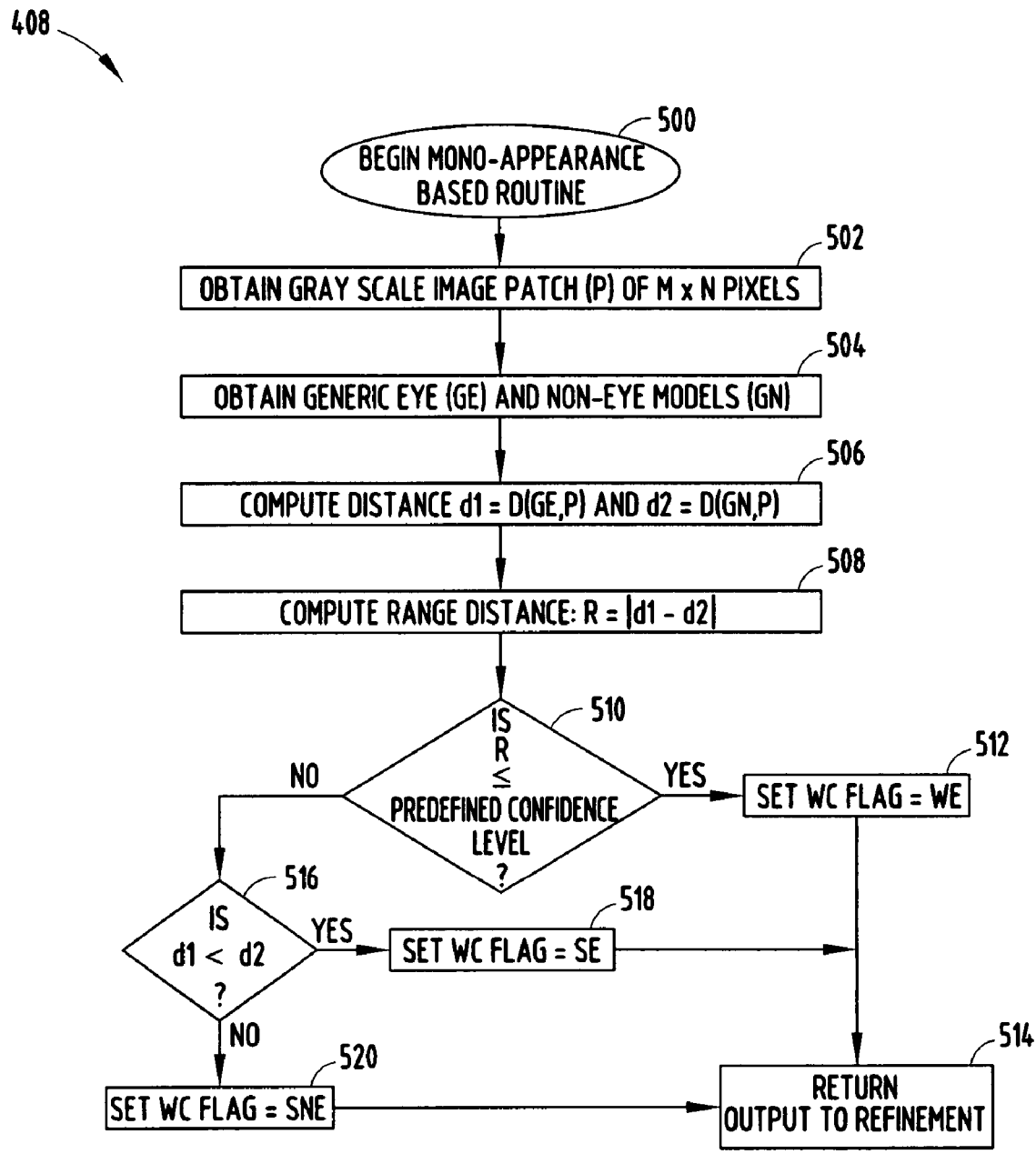
FIG. 17 is a flow diagram illustrating the steps of a mono-appearance based routine.

The mono-appearance based routine 408 is implemented as a subroutine illustrated in FIG. 17. The mono-appearance based routine 408 begins at step 500 and proceeds to obtain the gray scale image patch P of M×N pixels in step 502. Next, generic eye (GE) and generic non-eye models (GN) are obtained in step 504. Thereafter, distances d1 and d2 are computed as a function of comparing the image patch P to each of the generic eye and non-eye models in step 506. A range distance is computed as a function of the absolute value of the distance between distances d1 and d2 in step 508.

The mono-appearance based routine 408 proceeds to decision step 510 to compare the range distance to a predefined confidence level. If the range distance is less than or equal to the predefined confidence level, routine 408 proceeds to step 512 to set the winning candidate flag equal to weak eye, before returning the output to the refinement routine 126 in step 514. If the range distance is greater than the predefined confidence level, routine 408 proceeds to decision step 516 to determine if distance d1 is less than distance d2 and, if so, sets the winning candidate flag equal to strong eye in step 518 before returning to step 514. Otherwise, if the distance d1 is greater than or equal to distance d2, routine 408 sets the winning candidate flag equal to strong non-eye in step 520 before returning in step 514.

Returning to FIG. 16, the multi-resolution appearance test routine 126 determines if the output of the subroutine 408 is set equal to the strong non-eye flag and, if so, rejects the winning eye candidate and starts with the next video image in step 412. If the output of the subroutine 408 is set equal to a strong eye or weak eye, routine 126 proceeds to step 414 to extract another image patch of a third size level three (e.g., 64×104 pixels) in step 414, and applies the mono-appearance based routine again in step 408. If the output of the mono-appearance based routine is set equal to a strong non-eye as determined by decision step 416, routine 126 rejects the winning eye candidate and starts with the next video image in step 412. Otherwise, routine 126 accepts the winning eye candidate.

Returning to step 404, if the winning candidate flag is not equal to strong eye, routine 126 proceeds to step 418 to extract an image patch of the second size level two (e.g., 64×120 pixels) and applies the mono-appearance based routine in step 408. In decision step 420, the output of the mono-appearance based routine 408 is compared to a strong non-eye or weak eye and, if equal to a strong non-eye or weak eye, rejects the winning eye candidate and starts with the next video image in step 412. Otherwise, if the output of the mono-appearance based routine 408 is set equal to a strong eye, routine 126 proceeds to extract an image patch of a third size level three (e.g., 64×104 pixels) in step 422, before applying the mono-appearance based routine 408 again in step 408. The output of the mono-appearance based routine 408 is then compared in step 424 to a strong non-eye and, if the output is set equal to strong non-eye, the winning eye candidate is rejected and the routine starts over with the next image is acquired in step 412. Otherwise, the winning eye candidate is accepted in step 430.

Returning back to FIG. 7, the eye detection routine 100 accepts the eye candidate with high confidence as the detected eye or eyes in step 130. In decision step 132, routine 100 determines if the number of accepted eye candidates is equal to zero and, if so, returns to step 110. Otherwise, eye detection routine 100 ends detection at step 134.

Accordingly, the eye monitoring system 30 and eye detection routine 100 of the present invention advantageously captures and processes images of the subject face to detect one or both eyes 22. The system 30 and method 100 of the present invention is economical and easy to manufacture and deploy in a vehicle 10. It should be appreciated that the eye monitoring system 30 and method 100 may be employed in various applications employed both on and off a vehicle.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A system for detecting an eye, said system comprising:
a video imaging camera oriented to generate images of a face of a subject; and
a video processor for processing the images generated with the video imaging camera, said video processor comprising a salient feature detector for detecting potential eye candidates and filters for filtering the potential eye candidates based on appearance, spatial-geometrical constraint, and physiological skin property, said filters comprising a pattern recognition filter for filtering the potential eye candidates based on appearance, wherein the processor compares the potential eye candidates to one or more appearance-based models and classifies the potential eye candidates based on the comparison, said video processor further comprising weighting logic for weighting each potential candidate based on the appearance, spatial-geometrical constraint, and physiological skin property and generating a weighted value for each potential eye candidate, said video processor further comprising detecting logic for detecting an eye based on the weighted value of each eye candidate, wherein the filters comprise a spatial-geometrical constraint filter for weighting the potential eye candidates based on one or more spatial-geometrical constraints which compare horizontal eye candidates and compare vertical eye candidates.

2. The system as defined in claim 1, wherein said detecting logic detects the eye based on the weighted value of each eye candidate by comparing the weighted values of each of the eye candidates and detecting the eye based on the maximum weighted value.

3. The system as defined in claim 1, wherein said filters comprise a physiological skin property filter for weighting the potential eye candidates based on one or more physiological skin properties for comparing physiological properties of eye candidates to physiological properties of a skin region.

4. The system as defined in claim 1, wherein the video processor further includes a multi-resolution filter that compares a first patch of an eye candidate having a first size to one or more first models based on image recognition, and further compares a second patch of the eye candidate having a different second size to one or second models based on pattern recognition.

5. The system as defined in claim 1, wherein the video imaging camera is located on a vehicle to monitor the eye of the driver of the vehicle.

6. A method of detecting an eye, said method comprising the steps of:
storing one or more models in memory;
arranging a video imaging camera to generate images of a face of a subject;
generating an image of the face using the video imaging camera;
detecting salient features in the image as potential eye candidates with a video processor;
filtering the potential eye candidates based on appearance with the video processor, wherein the filtering comprises comparing the potential eye candidates to the one or more appearance-based models and classifying the potential eye candidates based on the comparison;
assigning a weighted value to each eye candidate based on the appearance with the video processor;
filtering the potential eye candidates based on one or more spatial-geometrical constraints comprising comparing pairs of horizontal eye candidates and comparing pairs of vertical eye candidates with the video processor;
assigning a weighted value to each eye candidate based on the spatial-geometrical constraints with the video processor;
filtering the potential eye candidates based on one or more physiological skin properties with the video processor;
assigning a weighted value to each eye candidate based on the physiological skin properties with the video processor; and
detecting an eye based on the weighted values of the eye candidates with the video processor.

7. The method as defined in claim 6, wherein the step of detecting an eye comprises comparing the weighted values of each of the eye candidates and detecting the eye based on the maximum weighted value.

8. The method as defined in claim 6, wherein the step of filtering the potential eye candidates based on appearance comprises applying a pattern recognition filter to the generated image.

9. The method as defined in claim 6, wherein the step of filtering the potential eye candidates based on physiological skin properties comprises comparing brightness of eye candidates to brightness of one or more skin regions.

10. The method as defined in claim 6 further comprising the step of comparing a first patch of the eye candidate having a first size to a first model based on pattern recognition and generating a first output, comparing a second patch of the eye candidate having a different second size to a second model based on pattern recognition and generating a second output, and assigning a weighted value to each eye candidate based on the comparison of the first and second patches.

11. The method as defined in claim 6, wherein said step of arranging a video camera comprises arranging the video camera in a vehicle to monitor the eye of the driver of the vehicle.

12. The system as defined in claim 4, wherein the first patch and the second patch of the image are both generally centered on an area of an eye candidate.

13. The system as define din claim 1, wherein the one or more appearance-based models comprises eye and non-eye models.

14. The system as defined in claim 13, wherein the processor computes a distance from the potential eye candidate to each eye and non-eye model and compares the distances in an eigen space to classify the potential eye candidates.

15. The method as defined in claim 6, wherein the one or more appearance-based models comprise eye and non-eye models.

16. The method as defined in claim 15, wherein the method computes a distance from the potential eye candidate to each eye and non-eye model and compares the distances in an eigen space to classify the potential eye candidates.

* * * * *